US 6,577,502 B1

(12) United States Patent
DiStefano et al.

(10) Patent No.: US 6,577,502 B1
(45) Date of Patent: Jun. 10, 2003

(54) MOBILE COMPUTER HAVING A HOUSING WITH OPENINGS FOR COOLING

(75) Inventors: Eric DiStefano, Livermore, CA (US); Krishna Seshan, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 90 days.

(21) Appl. No.: 09/605,918

(22) Filed: Jun. 28, 2000

(51) Int. Cl.[7] .............................. G06F 1/20; H05K 7/20
(52) U.S. Cl. ..................... 361/687; 361/683; 361/693
(58) Field of Search .......................... 361/687, 688, 361/679–686, 689–693

(56) References Cited

U.S. PATENT DOCUMENTS

| | | | | |
|---|---|---|---|---|
| 4,084,213 A | * | 4/1978 | Kirchner et al. | 361/687 |
| 4,980,848 A | * | 12/1990 | Griffin et al. | 361/687 |
| 5,313,362 A | * | 5/1994 | Hatada et al. | 361/687 |
| 5,331,508 A | * | 7/1994 | Hosoi et al. | 361/680 |
| 5,612,852 A | * | 3/1997 | Leverault et al. | 361/687 |
| 5,646,820 A | * | 7/1997 | Honda et al. | 361/683 |
| 5,774,331 A | * | 6/1998 | Sach | 361/687 |
| 6,058,009 A | * | 5/2000 | Hood, III et al. | 361/687 |
| 6,134,104 A | * | 10/2000 | Mohi et al. | 361/683 |
| 6,141,214 A | * | 10/2000 | Ahn | 361/687 |
| 6,453,378 B1 | * | 9/2002 | Olson et al. | 361/687 |

* cited by examiner

Primary Examiner—Darren Schuberg
Assistant Examiner—Lisa Lea-Edmonds
(74) Attorney, Agent, or Firm—Blakely, Sokoloff, Taylor & Zafman LLP (57) ABSTRACT

A mobile computer comprising a lower panel, a top panel, side panels, an electrical computer component, a plurality of keyboard keys, and a computer screen. The lower panel can be located over a horizontal surface. The top panel is vertically spaced from the lower panel. The side panels extend between the lower panel and the top panel. The panels define a housing. An air inlet opening is formed into the housing and an air outlet opening is formed at a higher elevation than the air inlet opening out of the housing. The electrical computer component is located within the housing. Power up of the component causes heating thereof. Air follows a natural convection path being through the air inlet opening into the housing, over the component, and out of the housing through the air outlet opening. The keys are located on the housing. The computer screen is mounted to the housing.

19 Claims, 9 Drawing Sheets

MOBILE COMPUTER HAVING A HOUSING WITH OPENINGS FOR COOLING

BACKGROUND OF THE INVENTION

1). Field of the Invention

This invention relates to a mobile computer having a housing with openings for cooling.

2). Discussion of Related Art

Mobile computers generally consist of a housing having a screen attached thereto. The screen can be pivoted between a position wherein it lies flat on the housing and a position where it extends away from the housing for purposes of viewing a display thereof. Older generations of mobile computers generated small amounts of power and heat generated within housings of such computers could easily be convected to air within the housings, conducted through panels of the housings and be convected and radiated from outer surfaces of the housings. Simplistic heat transfer of this kind has now become unsuitable for the relatively high amounts of power that are generated within mobile computers.

BRIEF DESCRIPTION OF THE DRAWINGS

The invention is described by way of examples with reference to the accompanying drawings wherein.

DETAILED DESCRIPTION OF THE INVENTION

Figure 1:
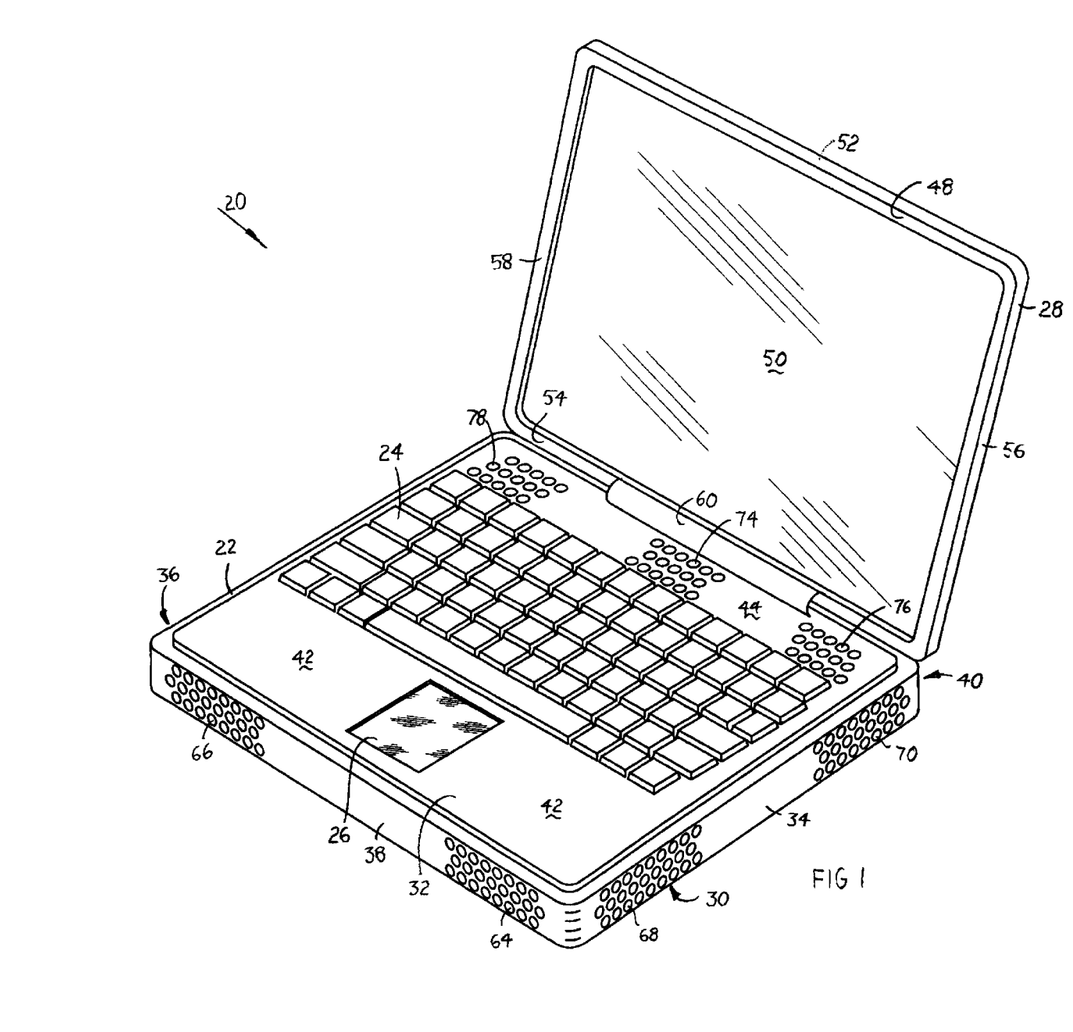
FIG. 1 is a perspective view of a mobile computer according to one embodiment of the invention.

FIG. 1 of the accompanying drawings illustrates a mobile computer 20 according to an embodiment of the invention. The computer 20 includes a housing 22, keys 24, a track pad 26, and a screen 28.

The housing 22 includes a lower panel 30, a top panel 32, a right-hand side panel 34, a left-hand side panel 36, a forward side panel 38, and a rearward side panel 40. The lower panel 30 can be located on a horizontal surface and the top panel 32 is vertically spaced from the lower panel 30. Each one of the side panels 34 to 40 is attached to and extends between a respective edge of the lower panel 30 and a respective edge of the top panel 32.

The track pad 26 is located in an area of the top panel 32 near the forward side panel 38 and half way between the left-hand and right-hand side panels 34 and 36. Wrist support portions 42 of the top panel 32 are located on opposing sides of the track pad 26.

The keys 24 are laid out in a "QWERTY" arrangement on a side of the track pad 26 opposing the forward side panel 38. The keys 24 extend through an opening or openings formed in the top panel 32. An additional portion 44 of the top panel 32 is provided on a side of the keys 24 opposing the track pad 26.

The screen 28 has a screen frame 48 and a display 50 located in the screen frame 48. The screen frame 48 has a top edge 52, a lower edge 54, and two opposing side edges 56 and 58 respectively. A hinge connector 60 attaches the lower edge 54 to the housing 22 at a location where the top panel 32 and the rearward panel 40 meet.

In use, a user locates the computer 20 so that the user is located on a side of the housing 22 opposing the screen 28. Wrists of the user can rest on the wrist support portions 42, from where the user can access the track pad 26 and the keys 24. From such a position the user can also view the display 50 of the screen 28.

The computer 20 as shown in FIG. 1 is in a less compact arrangement suitable for purposes of working wherein the screen 28 extends upward and away from the housing 22. The screen can also be folded down onto the housing 22 by pivoting on the hinge connector 60. The edges 52 to 58 of the screen frame 48 are then located along edges of the top panel 32. The computer 20 is then in a compact arrangement suitable for transportation.

Powering up of components within the housing 22 results in heating of these components. A plurality of air inlet openings and air outlet openings are formed in the housing 22 for purposes of cooling these components. For example, air inlet openings 64 are formed on the right-hand side of the forward side panel 38. The openings 64 are typically formed over an area wherein the openings 64 comprise about 60 percent of the area, and lands between the opening 64 the remaining 40 percent of the area. Air inlet openings 66 are also formed on the left-hand side of the forward side panel 38. Air inlet openings 68 are also formed towards the front of the right-hand side panel 34 and air inlet openings 70 are also formed towards the rear of the right-hand side panel 34. The left-hand side panel 36 has air inlet openings similar to the air inlet openings 68 and 70 in the right-hand side panel 34. Air outlet openings 74 are formed in a central region of the additional portion 44 of the top panel 32. More air outlet openings 76 are formed in a right-hand side of the additional portion 44 and more air outlet openings 78 are formed in a left-hand side of the additional portion 44. The air inlet openings 64 to 70 are located in vertical arrangements and the air outlet openings 74 to 78 are located in horizontal arrangements. The air outlet openings 74 to 78 are located higher than any of the air inlet openings 64 to 70.

Figure 2:
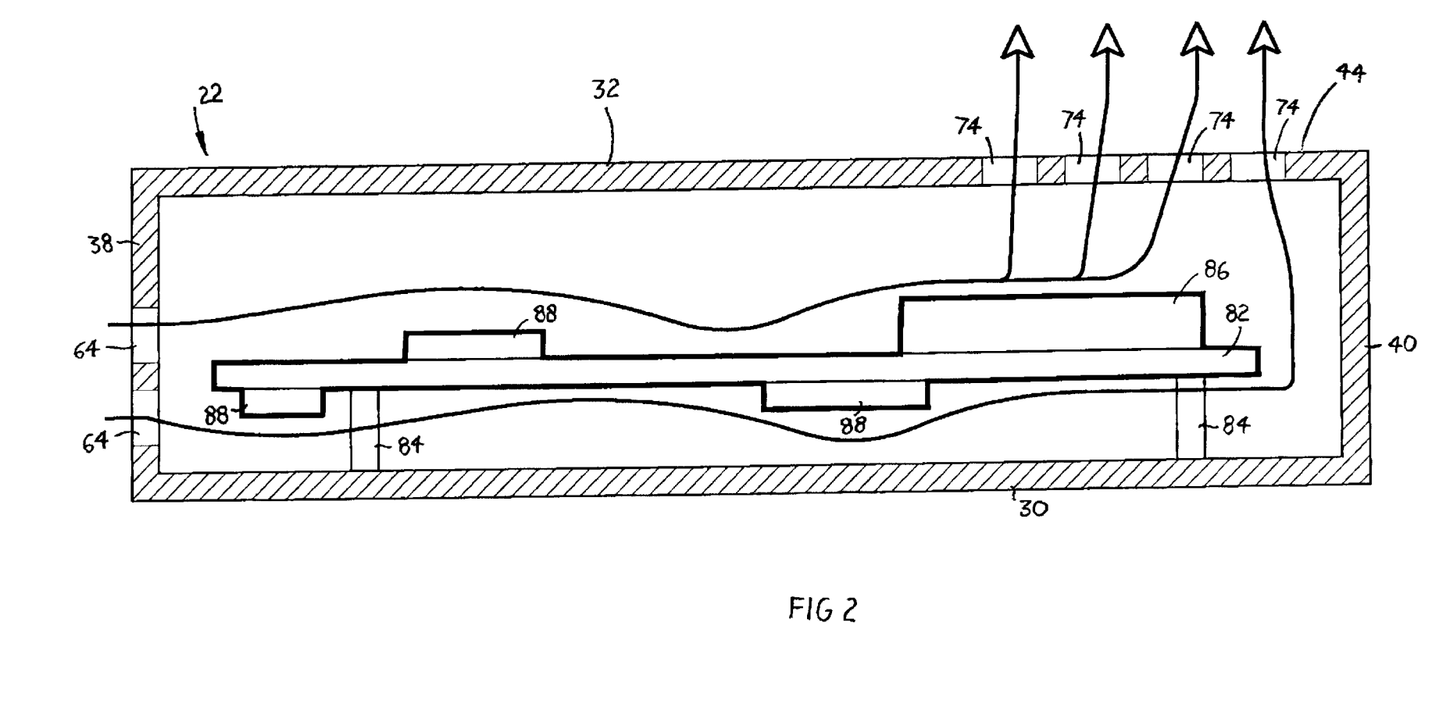
FIG. 2 is a cross-sectional side view of the computer showing a natural convection flow path of air through a housing thereof.

FIG. 2 is a cross section through the housing 22 showing the air inlet openings 64 and the air outlet openings 74, by way of example. A motherboard 82 is located within the housing 22 and is elevated from the lower panel 30 utilizing support pins 84. A number of electronic components are mounted to the motherboard 82 including a central processing unit processor 86 and other components 88. Some of the components 86 and 88 are mounted to an upper surface of the motherboard 82 and other ones are mounted to a lower surface of the motherboard 82. All the components 86 and 88 are located substantially between the air inlet openings 64 and the air outlet openings 74. The processor 86 is located directly below the air outlet openings 74.

In use, powering up of the components 86 and 88 results in heating up of the components 86 and 88. Heat is transferred from the components 86 and 88 to air within the housing 22. The heated air rises and escapes through the air outlet openings 74. A low pressure within the housing 22 then draws air ambient through the air inlet openings 64. Air therefore follows a natural convection path into the air inlet openings 64, through the housing 22 and out of the air outlet openings 74. The motherboard 82 and components 86 and 88 are strategically located so that the air flows over components 88 located on a lower surface of the motherboard 82 and more air flows over the components 88 and the processor 86 located on an upper surface of the motherboard 82.

Figure 3:
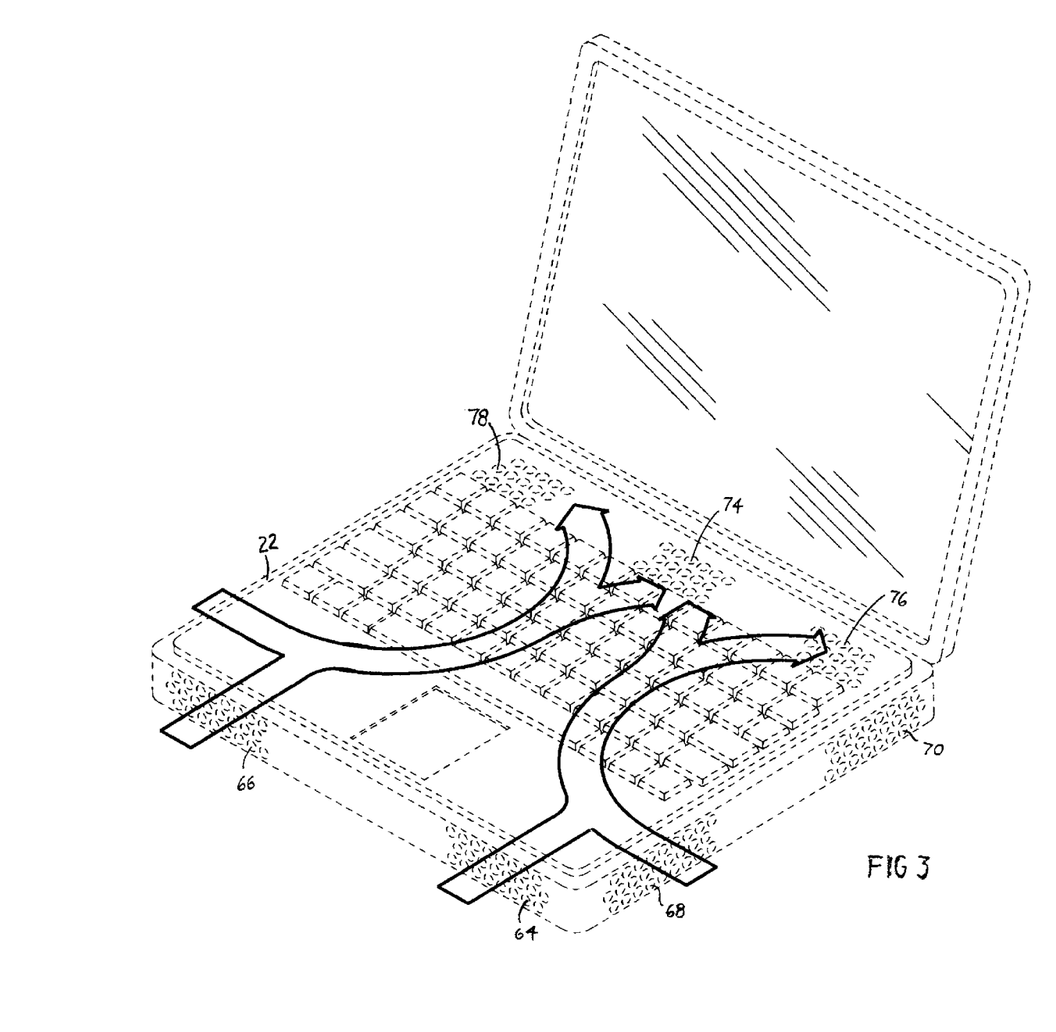
FIG. 3 is a view similar to FIG. 1 showing the computer in ghost lines and further showing flow of air through a housing of the computer.

As shown in FIG. 3, it is possible that air can be drawn into the air inlet openings 64, 66, 68, and more air inlet openings like the air inlet opening 68 on an opposing side of the housing 22. The air then flows through the housing 22 over electronic components that generate heat. The air then leaves the housing 22 through the air outlet openings 74, 76, and 78. More air can enter through the air inlet openings 70 and leave through the air outlet opening 76. The air inlet openings 64 to 70 and air outlet openings 74 to 78 are strategically located so that air flows over specifically identified electronic components within the housing 22 that generate heat. The number of openings, their relative sizes and locations are all optimized to create a predetermined air flow over specifically identified electronic components so as to transfer a predetermined amount of heat to the air by way of convection.

Figure 4:
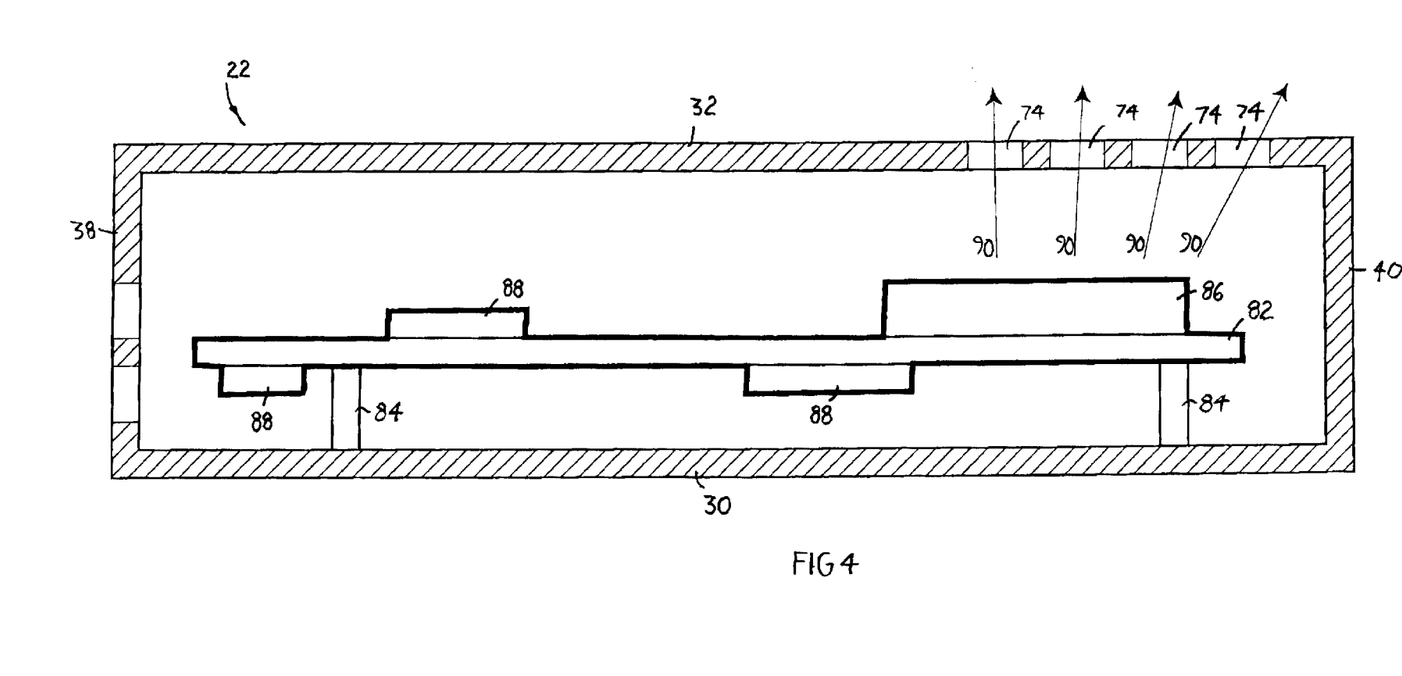
FIG. 4 is a view similar to FIG. 2 illustrating radiation from a processor of the computer.

FIG. 4 illustrates that radiation rays 90 are also radiated from the processor 86 through the air outlet openings 74. A processor at 80° C. transfers about 60 percent of its heat to air by way of convection and about 40 percent of its heat by way of radiation. Radiation heat transfers through the air outlet opening 74 may therefore be significant. The air outlet openings 74 are located in areas which would not cause discomfort to a user due to radiation from the processor 86.

Powering up of the processor 86 causes a temperature rise thereof so that there is a temperature difference between the processor 86 and the ambient air around the housing. In general, there would be a first temperature difference between the processor 86 and air around the housing when the air inlet openings and air outlet openings are not formed, and a second temperature difference between the processor 86 and air around the housing with the air inlet openings and air outlet openings being formed. The second temperature difference is usually at least 2° C. less for every 1 W power to which the processor 86 is powered up. For example, if this processor is powered up to 30 W, there would be a 60° C. temperature reduction of the processor due to the inlet openings and the outlet openings.

Figure 5:
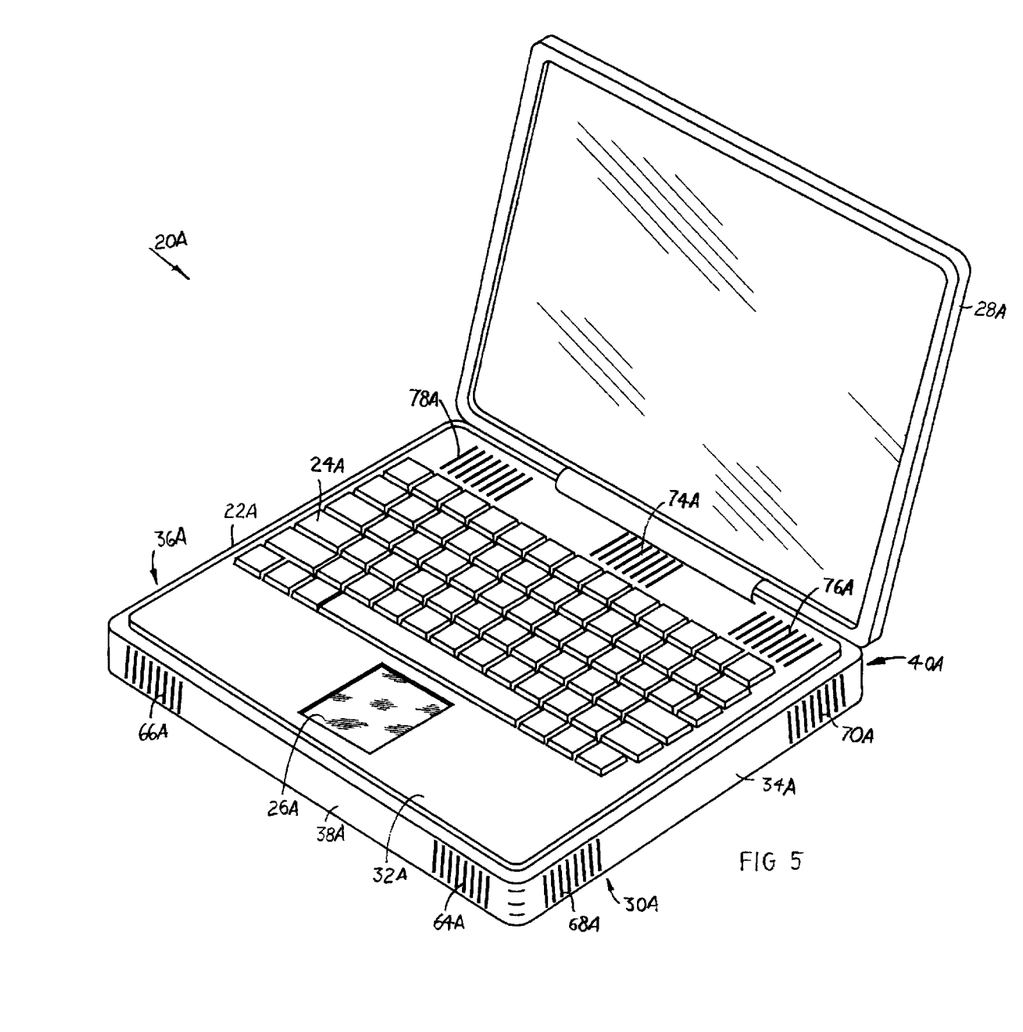
FIG. 5 is a perspective view of a mobile computer according to another embodiment of the invention.

FIG. 5 illustrates a computer 20A which has the same components as the computer 20 of FIG. 1. For example, the computer 20A also includes a housing 22A, keys 24A, a track pad 26A and a screen 28A. The housing 22A also has a lower panel 30A, a top panel 32A, and side panels 34A to 40A. The air inlet openings 64 to 70 are replaced with vertical air inlet slots 64A to 70A respectively. The air outlet openings 74 to 78 are replaced with air outlet slots 74A to 78A respectively. The slots in the housing 22A are for the same purpose as the openings in the housing 22. They are also similarly sized to allow for a similar degree of convection and radiation. The computer 20A is the same as the computer 20 in all other respects.

Figure 6:
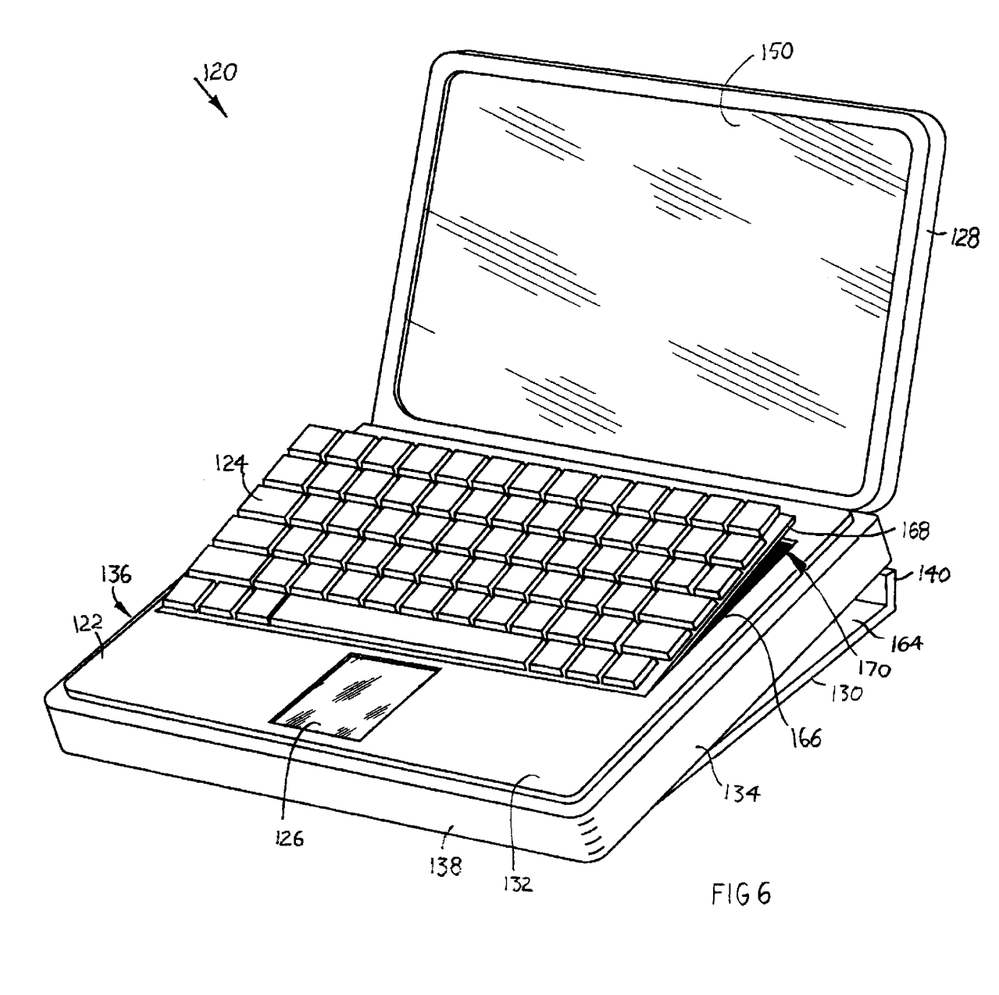
FIG. 6 is a perspective view of a mobile computer according to another embodiment of the invention wherein a user has to open a housing of the computer.

FIG. 6 illustrates a mobile computer 120 according to another embodiment of the invention. The computer 120 includes a housing 122, keys, 124, a track pad 126, and a screen 128.

The housing 122 includes a lower panel 130, a top panel 132, a right-hand side panel 134, a left-hand side panel 136, a forward side panel 138, and a rearward side panel 140. The lower panel 130 is located on a horizontal surface and the rearward side panel 140 extends upwardly from a rear edge of the lower panel 130. A lower edge of the forward side panel 138 is pivotally connected to the front edge of the lower panel 130. The forward side panel 138 extends upwardly from the lower panel 130 and is connected to a front edge of the top panel 132. The right-hand side panel 134 extends downwardly from a right-hand edge of the top panel 132 and the left-hand side panel 136 extends downwardly from a left-hand edge of the top panel 132. A lower partial enclosure is defined by the lower panel 130 and the rearward side panel 140 and an upper partial enclosure is formed by the top panel, and the forward, right-hand, and left-hand side panels 138, 134, and 136 respectively. The upper partial enclosure can pivot relative to the lower partial enclosure. A user can locate the computer 120 so that the user can view a display 150 on the screen 128. When the upper partial enclosure pivots towards the user, a gap 164 opens up in between a right-hand edge of the lower panel 130 and a lower edge of the right-hand side panel 134. A similar gap opens up on an opposing side of the housing 122. Pivoting of the upper partial enclosure in a direction away from the user closes the gap 164 and the gap on the opposing side of the housing 122.

A large rectangular keyboard opening 166 is formed in the top panel 132 between the pad 126 and a rear edge of the top panel 132. A keyboard panel 168 is located over the keyboard opening 166. A front edge of the keyboard panel 168 near the track pad 126 is pivotally connected to a front edge of the keyboard opening 166. The keys 124 are all mounted to the keyboard panel 168. Pivoting of the keyboard panel 168 towards the user results in lifting of a rear edge of the keyboard panel 168 off a rear edge of the keyboard opening 166 so that a gap 170 opens up. The gap 170 located below all edges of the keyboard panel 166 except the front edge thereof.

Figures 7, 8, 9:
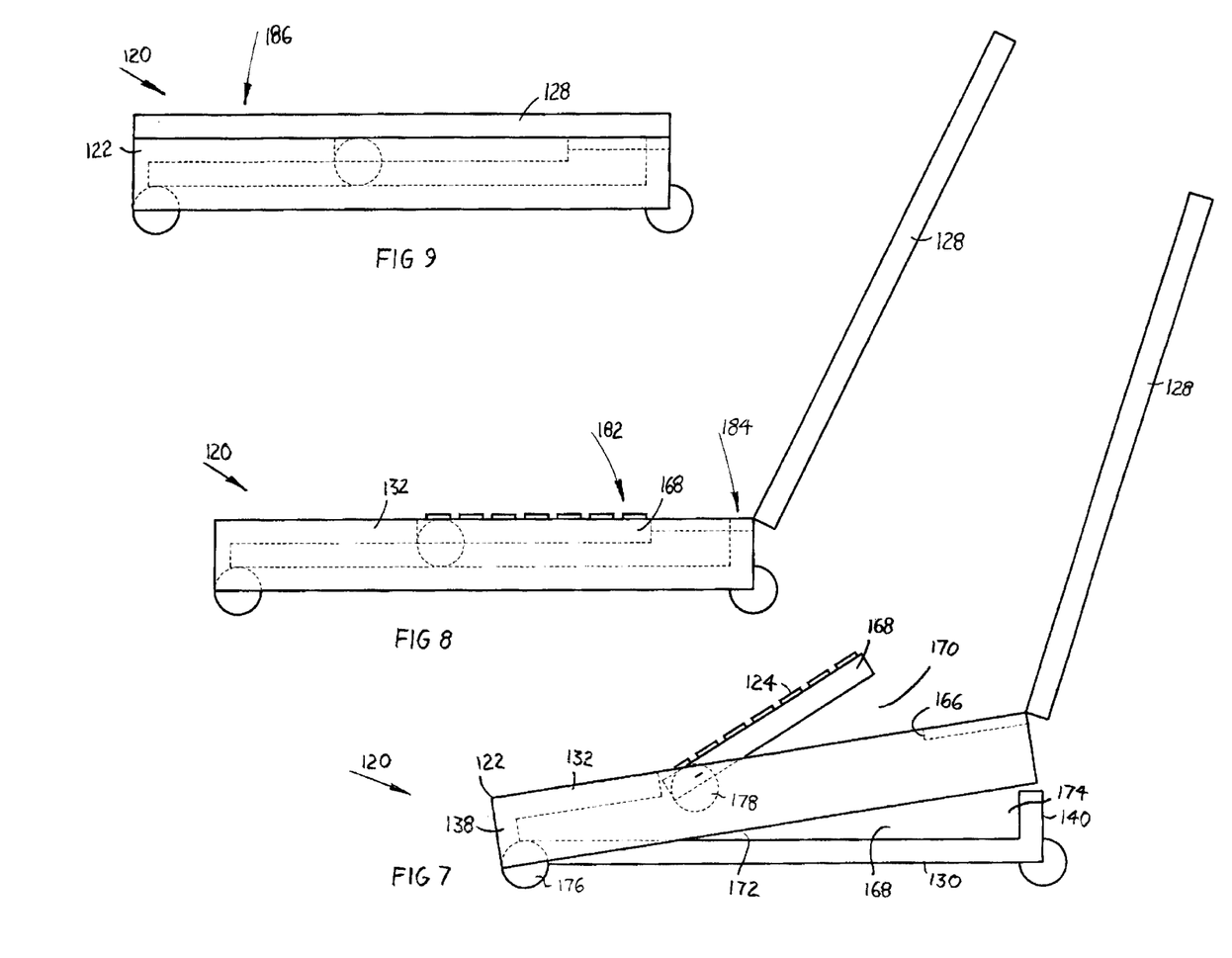
FIG. 7 is a side view of the computer shown in a working arrangement.
FIG. 8 is a view similar to FIG. 7 wherein the housing of the computer is closed.
FIG. 9 is a view similar to FIG. 8 wherein a screen of the computer is folded down onto the housing.

FIG. 7 illustrates the computer 120 from a right-hand side thereof. The computer 120 is shown with both the upper partial enclosure and the keyboard panel 168 pivoted towards a user so that the gap 168 and the gap 170 are both open. Air can enter into a front opening 172 of the gap 168 and flow back and upward over computer components within the housing 122 and then flow out of the housing 122 through an opening 174 of the gap 168 in a rear of the housing 122. A natural convection path is provided because the opening 174 is higher than the opening 172. The air may also leave the housing 122 through a rear of the gap 170. A natural convection path is provided because the gap 170 is located higher than the opening 172.

A ratchet 176 is provided that rotates in a ratchet action when the upper partial enclosure pivots relative to the lower partial enclosure. A user can pivot the upper partial enclosure to a required angle relative to the lower partial enclosure and the ratchet 176 retains the upper partial enclosure at the selected angle. A ratchet 178 is also provided which allows for pivoting of the keyboard panel 168 relative to the top panel 132. The user can pivot the keyboard panel 168 to a desired angle and the ratchet 178 retains the keyboard panel 168 at the desired angle.

As shown in FIG. 8, the keyboard panel 168 can be pivoted away from the user in a downward direction 182 until the keyboard panel 168 is located substantially co-planar with the top panel 132. The upper partial enclosure can also be pivoted away from the user in a downward direction 184. Both the gap 168 and the gap 170 of FIG. 7 are so closed. The screen 128 is pivotally connected to a rear edge of the top panel 132. As shown in FIG. 9, the screen can be pivoted towards the user in a direction 186 onto the housing 122. The computer 120 as shown in FIG. 9 is suitable for transportation. A reverse of the steps shown in FIG. 7, FIG. 8, and FIG. 9 can be carried out to again set the computer 120 up for operational purposes of working.

Figure 10:
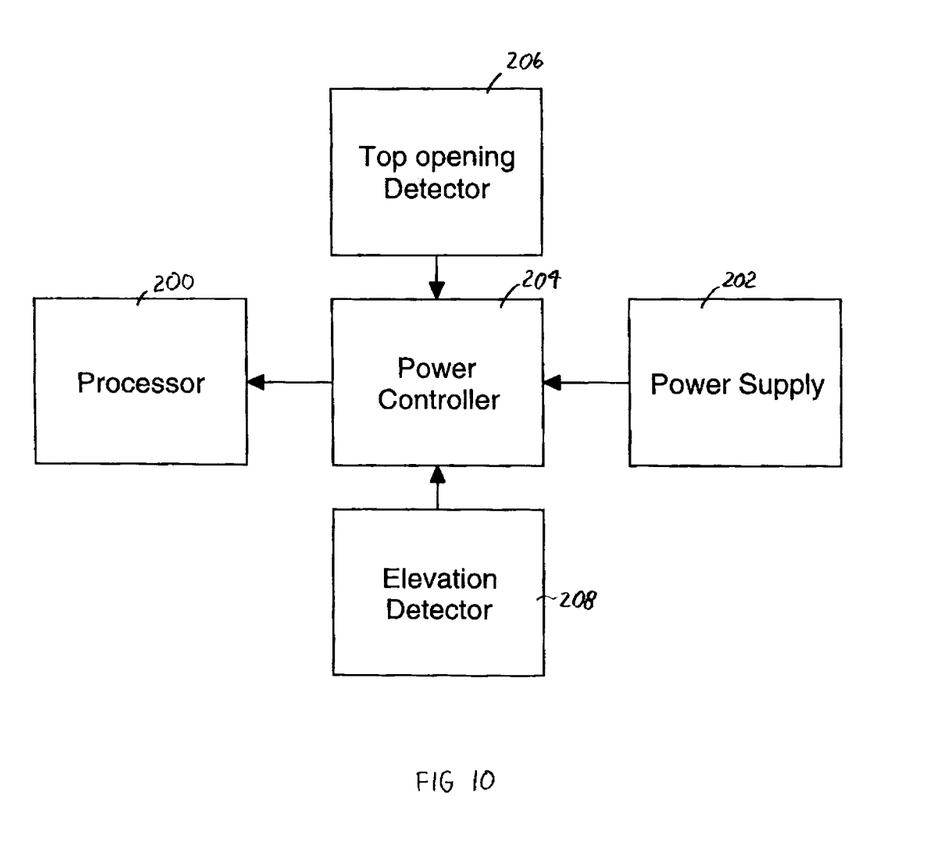
FIG. 10 is a block diagram of components of the computer of FIG. 6 which are used for setting power provided to a processor thereof dependent on whether the housing is open or closed.

In order to provide a user an incentive to open the housing 122 as shown in FIG. 6 and FIG. 7, power to a processor is reduced when the housing is closed and power is increased when the housing is open. FIG. 10 illustrates components of the computer for achieving such purpose. The components include a processor 200, a power supply 202, a power controller 204, a top opening detector 206, and an elevation detector 208. Power is supplied by the power supply 202 through the power controller 204 to the processor 200. The power controller 204 controls the amount of power supplied by the power supply 202 to the processor 200. The top opening detector 206 and the elevation detector 208 both provide information to the power controller 204. The power controller 204 regulates power provided to the processor 200 dependent on information provided to the power controller 204 by the top opening detector 206 and the elevation detector 208. Top opening detector 206 may for example be a limit switch and the elevation detector 208 may also be a separate limit switch. In another embodiment both the top opening detector 206 and the elevation detector 208 may be in the form of a single switch or a single detector.

Figure 11:
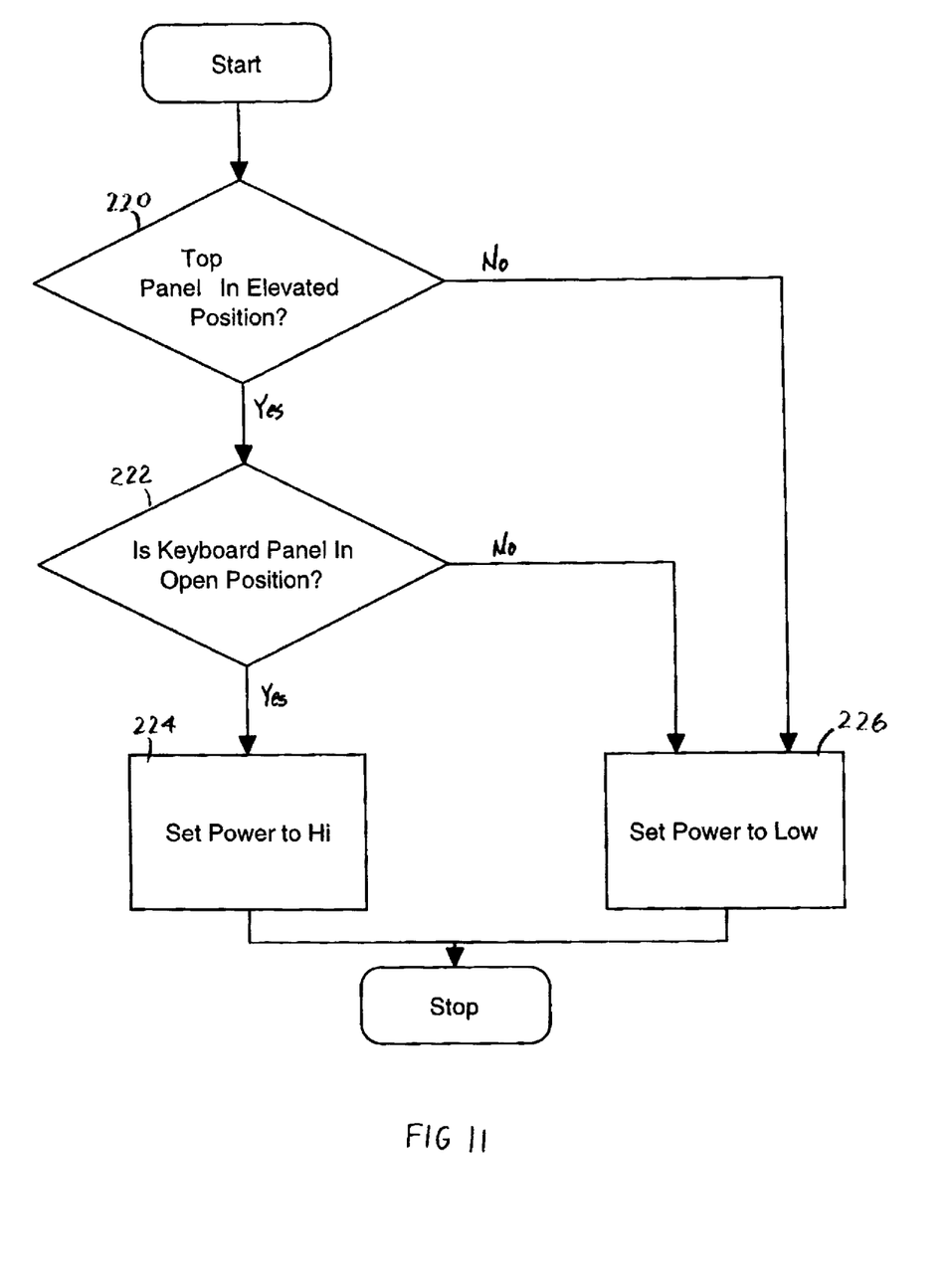
FIG. 11 is a flow chart illustrating how power is adjusted utilizing the components of FIG. 10.

FIG. 11 illustrates how the power controller 204 regulates power provided to the processor 200. In step 220 the power controller 204 determines whether the top panel is in the elevated position. The elevated position of the top panel is shown in FIG. 6 and FIG. 7. The power controller 204 determines whether the top panel is in the elevated position when such information is provided thereto by the elevation detector 204. If the top panel is in the elevated position then step 222 is executed. In step 222 the power controller 204 determines whether the keyboard panel is in the open position shown in FIG. 6 and FIG. 7. The power controller 204 determines whether the keyboard is in the open position because the top opening detector 206 provides such information to the power controller. If the keyboard is in the open position, step 224 is executed. In step 224 power provided by the power supply to the processor 200 is set to "HIGH". If in step 220 the top panel is determined to be in any position other than the elevated position, step 226 is executed wherein the power is set to "LOW". In step 222, if it is determined that the keyboard is in any position other than a fully opened position, step 226 is also executed. It can thus be seen that power will only be set to "HIGH" if the top panel is in a fully elevated position and the keyboard panel is in a fully opened position. A user will therefore not be able to harness maximum power from the processor 200 unless the user adjusts the top panel to the fully elevated position and adjusts the keyboard to the fully open position.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A mobile computer comprising:
   a lower panel to be located over a horizontal surface;
   a top panel vertically spaced from the lower panel;
   side panels between the lower panel and the top panel, the panels defining a housing, an air inlet opening being formed into the housing, and an air outlet opening being formed at a higher elevation than the air inlet opening out of the top panel;
   an electrical computer component located within the housing, powering up of the component causing heating thereof, air following a natural convection path being through the air inlet opening into the housing, past the component so that heat transfers from the component to the air, and out of the housing while rising through the air outlet opening;
   a plurality of keyboard keys on the housing; and
   a computer screen mounted to the housing behind the air outlet openings and the keyboard keys.

2. The mobile computer of claim 1 wherein a plurality of air inlet openings are formed into the housing and a plurality of air outlet openings are formed out of the housing, the air outlet openings being at higher elevations than the air inlet openings.

3. The mobile computer of claim 2 wherein the air inlet openings are formed over an area including the air inlet openings and land of the housing between the air inlet openings, the air inlet openings comprising at least 40 percent of the area and the land comprising less than 60 percent of the area.

4. The mobile computer of claim 2 wherein the air outlet openings are formed over an area including the air outlet openings and land of the housing between the air outlet openings, the air outlet openings comprising at least 40 percent of the area and the land comprising less than 60 percent of the area.

5. The mobile computer of claim 2 wherein the air outlet openings are located on a different side of the housing than the air inlet openings.

6. The mobile computer of claim 2 wherein powering up of the component to a predetermined power results in an increase in temperature of the component so that there is a first temperature difference between the component and ambient air around the housing without the air inlet openings and the air outlet openings, and a second temperature difference between the component and the ambient air with the air inlet openings and the air outlet openings, the second temperature difference being at least 2° C. less for every 1 W of the predetermined power.

7. The mobile computer of claim 2 wherein the component is located between the air inlet openings and the air outlet openings.

8. The mobile computer of claim 2 wherein the component radiates heat through at least some of the openings.

9. The mobile computer of claim 8 wherein at least 30 percent of all heat transferred from the component at a given moment is by radiation to at least some of the openings.

10. The mobile computer of claim 1 wherein the air inlet openings are located in one of the side panels.

11. The mobile computer of claim 1 wherein there is no fan in the natural convection path forcing air through the natural convection path.

12. A mobile computer comprising:

a lower panel to be located over a horizontal surface;

a top panel vertically spaced from the lower panel;

side panels extending between the lower panel and the top panel, the lower, side and top panels defining a housing, a plurality of air inlet openings being formed in one of the panels other than the top panel, and a plurality of air outlet openings being formed at a higher elevation out of the top panel;

an electrical computer component located within the housing, powering up of the electrical component causing heating thereof, air following a natural convection path being through the air inlet openings at a lower elevation into the housing, past the electrical component which causes transfer of heat from the electrical component to the air, and rising out of the housing through the air outlet openings out of the top panel;

a plurality of keyboard keys on the housing; and a computer screen mounted to the housing behind the air outlet openings, the computer screen being movable between a storage position wherein the housing and the computer screen form a compact arrangement suitable for transportation, and an operational position wherein the computer screen extends away from the housing so that the housing and the computer screen form a less compact arrangement less suitable for transportation.

13. The mobile computer of claim 12 wherein the air inlet openings are formed over an area including the air inlet openings and land of the housing between the air inlet openings, the air inlet openings comprising at least 40 percent of the area and the land comprising less than 60 percent of the area.

14. The mobile computer of claim 12 wherein the air outlet openings are formed over an area including the air outlet openings and land of the housing between the air outlet openings, the air outlet openings comprising at least 40 percent of the area and the land comprising less than 60 percent of the area.

15. The mobile computer of claim 12 wherein the air inlet openings are located in one of the side panels.

16. The mobile computer of claim 12 wherein powering up of the component to a predetermined power results in an increase in temperature of the component so that there is a first temperature difference between the component and ambient air around the housing without the air inlet openings and the air outlet openings, and a second temperature difference between the component and the ambient air with the air inlet openings and the air outlet openings, the second temperature difference being at least 2° C. less for every 1 W of the predetermined power.

17. The mobile computer of claim 12 wherein the component is located between the air inlet openings and the air outlet openings.

18. A mobile computer comprising:

a lower panel to be located over a horizontal surface;

a top panel vertically spaced from the lower panel;

side panels extending between the lower panel and the top panel the lower, side and top panels defining a housing, a plurality of air inlet openings being formed in one of the panels other than the top panel, wherein the air inlet openings are formed over an area including the air inlet openings and land of the housing between the air inlet openings, the air inlet openings comprising at least 40 percent of the area and the land comprising less than 60 percent of the area, and a plurality of air outlet openings being formed at a higher elevation out of the top panel, wherein the air outlet openings are formed over an area including the air outlet openings and land of the housing between the air outlet openings, the air outlet openings comprising at least 40 percent of the area and the land comprising less than 60 percent of the area;

an electrical computer component located within the housing between the air inlet openings and the air outlet openings, powering up of the electrical component causing heating thereof, air following a natural convection path being through the air inlet openings at a lower elevation into the housing, over the electrical component which causes transfer of heat from the electrical component to the air, and rising out of the housing through the air outlet openings out of the top panel;

a plurality of keyboard keys on the housing; and a computer screen mounted to the housing behind the air outlet openings, the computer screen being movable between a storage position wherein the housing and the computer screen form a compact arrangement suitable for transportation, and an operational position wherein the computer screen extends away from the housing so that the housing and the computer screen form a less compact arrangement less suitable for transportation.

19. The mobile computer of claim 18 wherein powering up of the component to a predetermined power results in an increase in temperature of the component so that there is a first temperature difference between the component and ambient air around the housing without the air inlet openings and the air outlet openings, and a second temperature difference between the component and the ambient air with the air inlet openings and the air outlet openings, the second temperature difference being at least 2° C. less for every 1 W of the predetermined power.

* * * * *